US005121679A

United States Patent [19]

Mertz

[11] Patent Number: 5,121,679

[45] Date of Patent: Jun. 16, 1992

[54] POTATO CUTTING APPARATUS

[76] Inventor: Myron M. Mertz, 405 16th Ave. NE., Mandan, N. Dak. 58554

[21] Appl. No.: 790,818

[22] Filed: Nov. 12, 1991

[51] Int. Cl.[5] .......... A47J 17/00

[52] U.S. Cl. .......... 99/538; 83/425.3; 83/437; 83/865; 99/537

[58] Field of Search .......... 99/537, 538, 495, 547, 99/567, 588, 485; 30/862-865, 425.3, 437

[56] References Cited

U.S. PATENT DOCUMENTS

| | | | |
|---|---|---|---|
| 579,816 | 3/1897 | Buchmann | 99/537 |
| 608,368 | 8/1898 | Lawson | 99/537 |
| 1,361,776 | 12/1920 | Rosenfeld | 99/538 |
| 2,457,645 | 12/1948 | Cummings | 99/568 |
| 2,836,212 | 5/1958 | Shaw | 99/538 |
| 3,687,688 | 8/1972 | Stapley et al. | 83/865 |
| 3,830,151 | 8/1974 | Gerson | 99/537 |
| 4,436,025 | 3/1984 | Jones | 83/437 |
| 4,569,280 | 2/1986 | D'Ambro et al. | 99/537 |
| 4,644,838 | 2/1987 | Samson et al. | 83/865 |
| 4,704,959 | 11/1987 | Scallen | 99/538 |

FOREIGN PATENT DOCUMENTS

| | | | |
|---|---|---|---|
| 1965331 | 7/1971 | Fed. Rep. of Germany | 99/537 |

*Primary Examiner*—Timothy F. Simone
*Attorney, Agent, or Firm*—Leon Gilden

[57] ABSTRACT

A support plate mounts a matrix of tubular cutters orthogonally mounted to the plate, with the tubular cutters projecting through the plate, whereupon projecting of the tubular cutters through an associated potato projects cylindrical segments rearwardly of the plate for use as "French-fry" type potatoes. The plate includes interfitting projections received within associated recesses to position and maintain the plate relative to an associated die table, wherein the die table includes crossed support bars to support a potato thereon, and wherein the support bars are received through the matrix of cutting tubes and wherein the recesses each include a respective floor spaced from a die table floor a spacing substantially equal to an associated projecting tubular cutter.

5 Claims, 4 Drawing Sheets

POTATO CUTTING APPARATUS

BACKGROUND OF THE INVENTION

1. Field of the Invention

The field of invention relates to cutting apparatus, and more particularly pertains to a new and improved potato cutting apparatus wherein the same is arranged for the cutting and compacting of potato portions for use in a French-fry type potato product.

2. Description of the Prior Art

Potato cutting of various types have been utilized throughout the prior art and may be formed for domestic and commercial production. Such apparatus is exemplified in U.S. Pat. No. 4,704,959 to Scallen wherein the sleeve is projected within a container for projecting a potato-type product through a cutting grid.

U.S. Pat. No. 3,764,345 to Beck, et al. sets forth a French-fry potato cutting apparatus wherein a plate member is arranged to direct a potato through a cutting die board.

U.S. Pat. No. 4,644,838 to Samson, et al. sets forth an apparatus for the helical cutting of potatoes.

As such, it may be appreciated that there continues to be a need for a new and improved potato cutting apparatus as set forth by the instant invention which addresses both the problems of ease of use as well as effectiveness in construction and in this respect, the present invention substantially fulfills this need.

SUMMARY OF THE INVENTION

In view of the foregoing disadvantages inherent in the known types of potato cutting apparatus now present in the prior art, the present invention provides a potato cutting apparatus wherein the same utilizes tubular cutters to effect compacting and cutting of tubular product from potatoes for use in a French-fry product production. As such, the general purpose of the present invention, which will be described subsequently in greater detail, is to provide a new and improved potato cutting apparatus which has all the advantages of the prior art potato cutting apparatus and none of the disadvantages.

To attain this, the present invention provides a support plate mounting a matrix of tubular cutters orthogonally mounted to the plate, with the tubular cutters projecting through the plate, whereupon projecting of the tubular cutters through an associated potato projects cylindrical segments rearwardly of the plate for use as "French-fry" type potatoes. The plate includes interfitting projections received within associated recesses to position and maintain the plate relative to an associated die table, wherein the die table includes crossed support bars to support a potato thereon, and wherein the support bars are received through the matrix of cutting tubes and wherein the recesses each include a respective floor spaced from a die table floor a spacing substantially equal to an associated projecting tubular cutter.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved potato cutting apparatus which has all the advantages of the prior art potato cutting apparatus and none of the disadvantages.

It is another object of the present invention to provide a new and improved potato cutting apparatus which may be easily and efficiently manufactured and marketed.

It is a further object of the present invention to provide a new and improved potato cutting apparatus which is of a durable and reliable construction.

An even further object of the present invention is to provide a new and improved potato cutting apparatus which is susceptible of a low cost of manufacture with regard to both materials and labor, and which accordingly is then susceptible of low prices of sale to the consuming public, thereby making such potato cutting apparatus economically available to the buying public.

Still yet another object of the present invention is to provide a new and improved potato cutting apparatus which provides in the apparatuses and methods of the prior art some of the advantages thereof, while simultaneously overcoming some of the disadvantages normally associated therewith.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
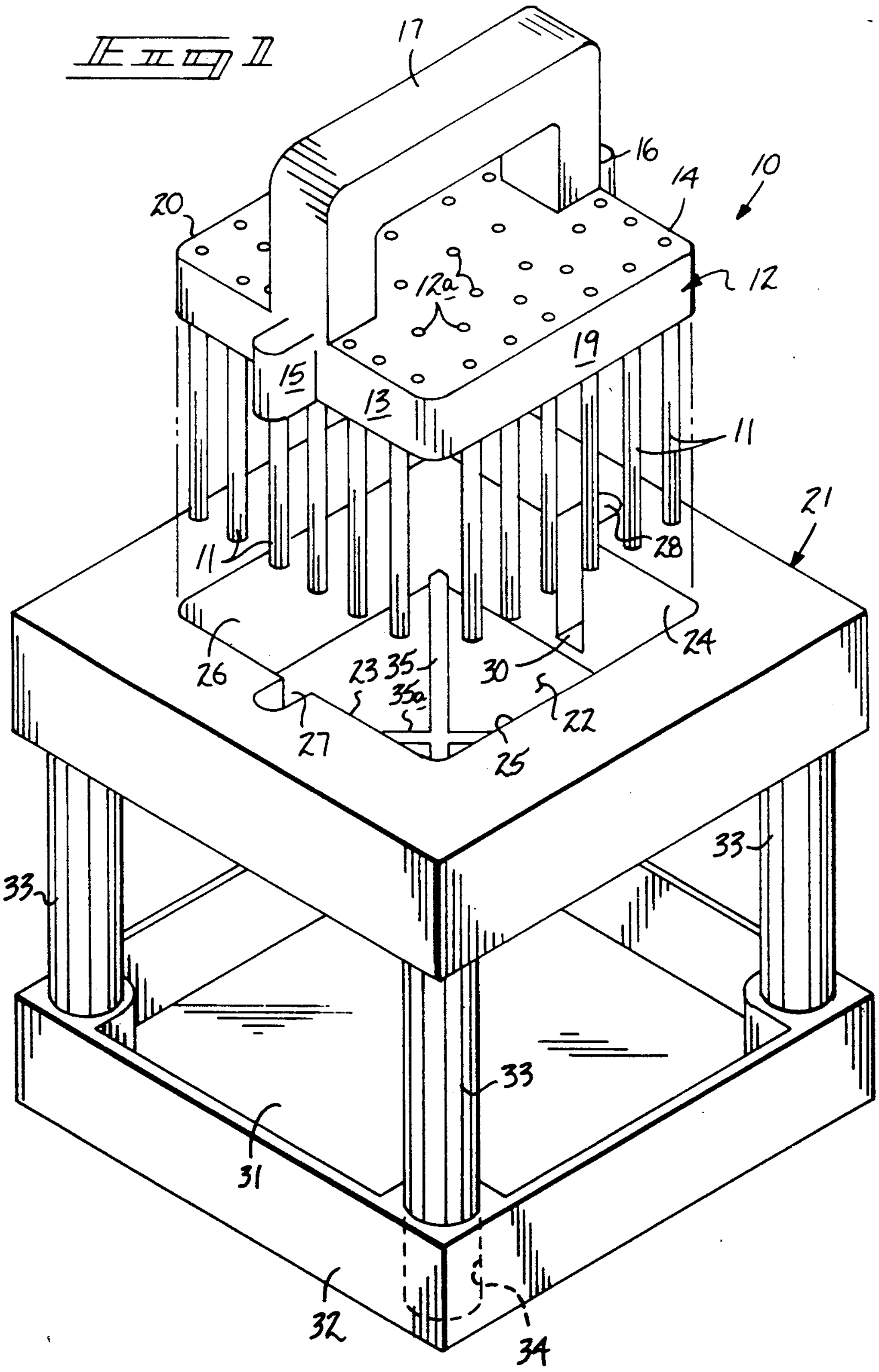
FIG. 1 is an isometric illustration of the instant invention.
Figure 2:
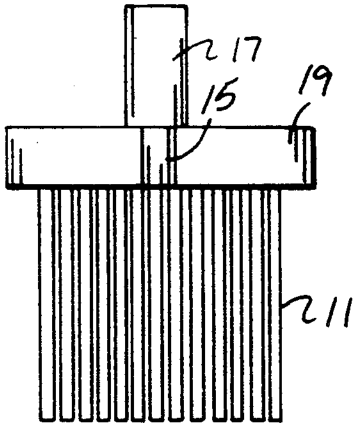
FIG. 2 is an orthographic side view of the potato cutting apparatus plate and tubular cutters utilized by the invention.
Figure 3:
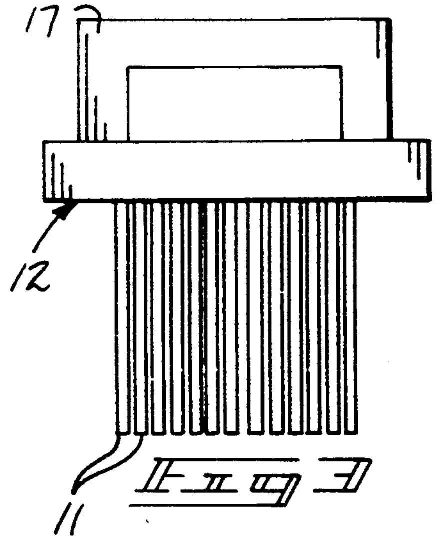
FIG. 3 is an orthographic side view of the apparatus as set forth in FIG. 2.
Figure 4:
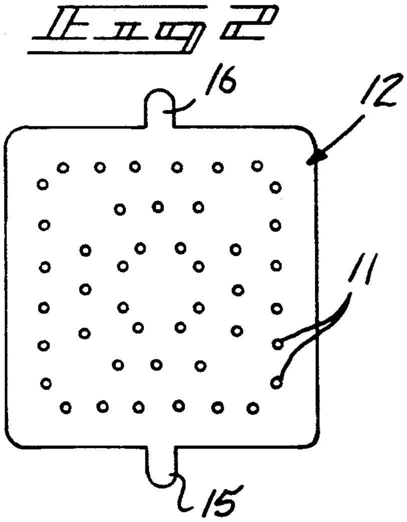
FIG. 4 is an orthographic bottom view of the apparatus, as set forth in the FIGS. 2 and 3.
Figure 5:
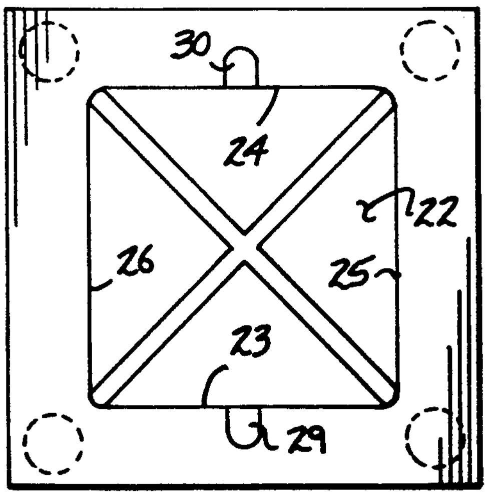
FIG. 5 is an orthographic top view of the die table utilized by the invention.
Figure 6:
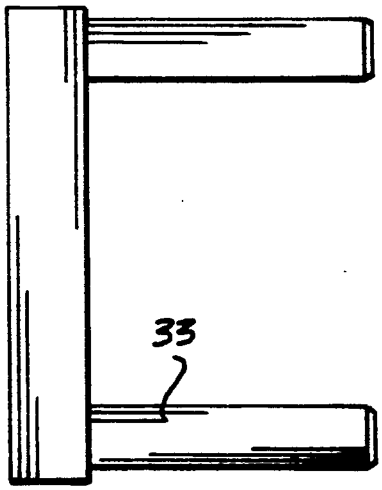
FIG. 6 is an orthographic side view of the die table.
Figure 7:
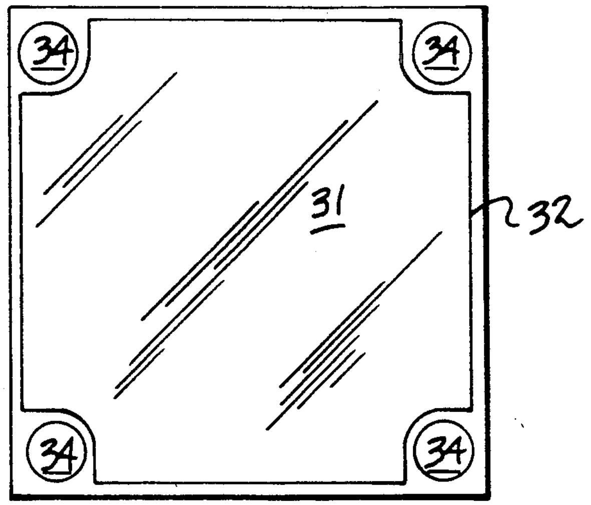
FIG. 7 is an orthographic top view of the underlying floor plate structure utilized by the die cutting table.
Figure 8:
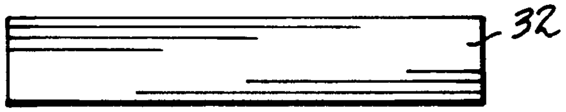
FIG. 8 is an orthographic side view of the floor structure, as set forth in FIG. 7.

With reference now to the drawings, and in particular to FIGS. 1 to 10 thereof, a new and improved potato cutting apparatus embodying the principles and concepts of the present invention and generally designated by the reference numerals 10 and 10*a* will be described.

More specifically, the potato cutting apparatus 10 of the instant invention essentially comprises a matrix of parallel cutting tubes 11, wherein each lower terminal end of each cutting tube terminates in an annular cutting edge, and wherein the tubes are orthogonally directed through a tube support plate 12 into the support plate's bottom surface and terminating in alignment with the support plate's top surface that is arranged in a parallel spaced relationship relative to the support plate's bottom surface. The support plate 12 includes a first side 13 spaced from and parallel a second side 14 spaced apart a predetermined first spacing, with a first end wall 19 spaced from a second end wall 20 spaced apart a predetermined second spacing. A first side projection 15 is mounted medially of the first side 13 projecting exteriorly thereof, with a second side projection 16 oriented medially of and projecting exteriorly of the second side 14. A manual grasp handle 17 extends above the support plate—s top surface of a generally "U" shaped configuration to arranged for manual grasping of the support plate in use. A die table 21 is provided, including a die table opening 22 formed with an opening first side wall 23 spaced from an opening second side wall 24 that are spaced apart the first spacing to receive the first and second sides 13 and 14 complementarily therebetween. A first end wall 25 is spaced from a second end wall 26 within the opening 22 spaced apart the second spacing equal to the predetermined second spacing between the first and second end walls 19 and 20. The opening first side wall 23 includes a first side wall recess 27 arranged to complementarily receive the first side projection 15, with a second side wall recess 28 projecting into the die table 21 to receive the second side projection 16. The first and second side wall recesses 27 and 28 each include a first and second recess floor 29 and 30 that are coplanar and are spaced above the die table—s bottom surface to provide for abutment of the first and second projections 15 and 16 when directed into the first and second recesses 27 and 28. The first and second recess floor 29 and 30 are therefore spaced above an associated die table floor 31 a predetermined distance substantially equal to a predetermined length of each cutting tube 11 projecting from the support plate's bottom surface. The die table floor 31 includes a die table side wall 32 extending completely thereabout, wherein the die table includes a plurality of leg members 33, with each leg member received within an associated side wall socket 34 formed within the side wall 32. The side wall sockets 34 are therefore arranged in a parallel relationship relative to one another and orthogonally oriented relative to the floor 31. First and second support bars 35 and 35*a* respectively are crossed within the opening 22 to position a potato thereon and wherein the support bars 35 and 35*a* are received between the matrix of cutting tubes 11 for final abutment onto the support plate's bottom surface.

Figure 9:
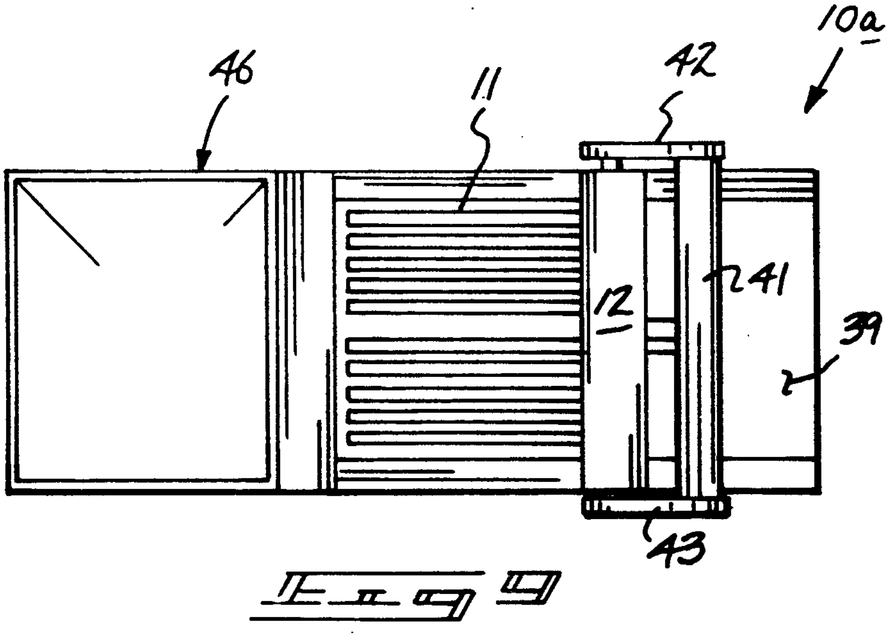
FIG. 9 is an orthographic top view of the modification of the invention.
Figure 10:
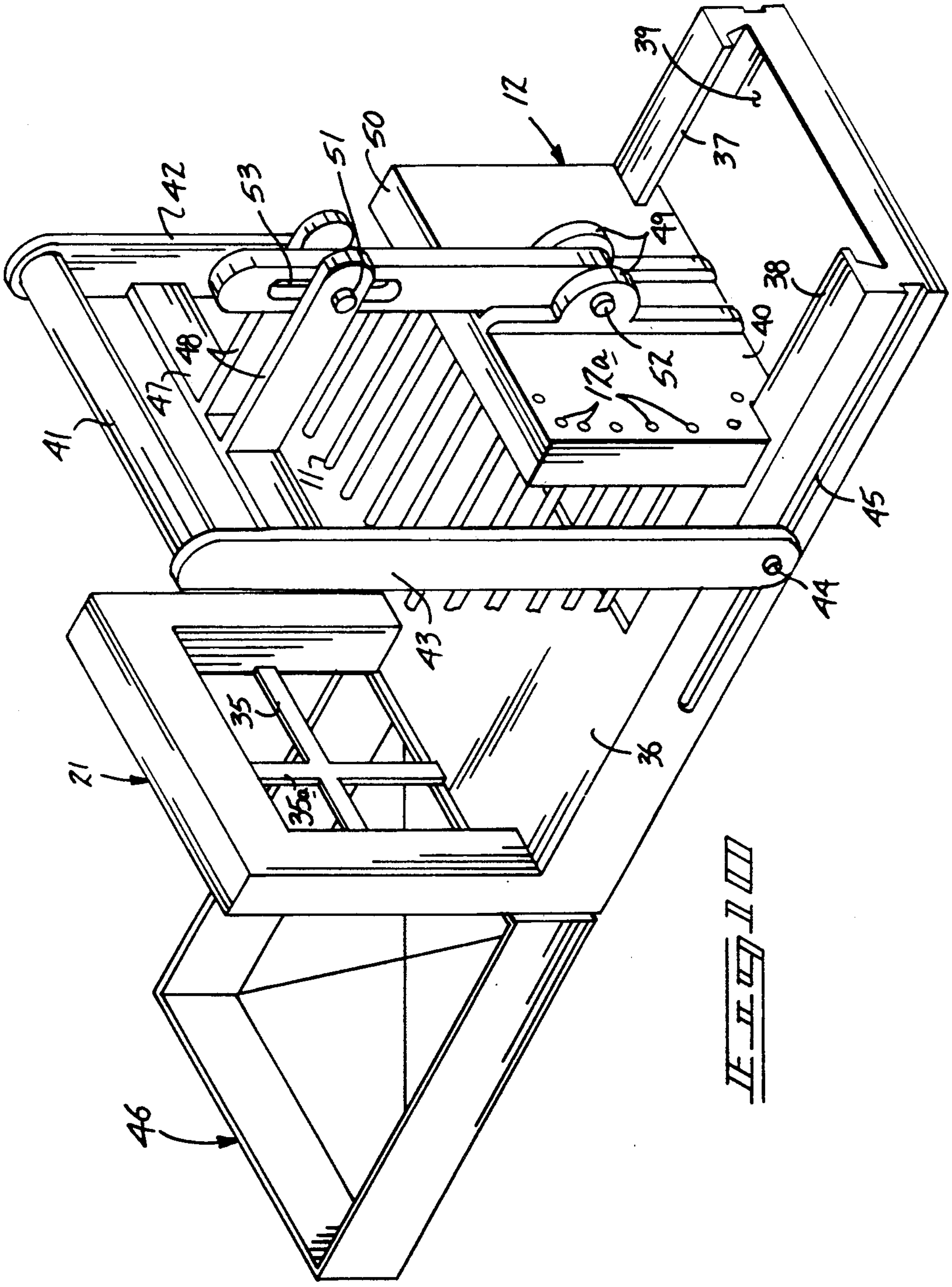
FIG. 10 is an isometric illustration of the modified aspect of the invention.

The FIGS. 9 and 10 illustrate a modified aspect of the invention to include a support table 36, including right and left flanges 37 and 38 defining a "T" shaped guide groove 39 to receive a support plate's "T" shaped projection 40 as the support plate 12 is arranged orthogonally relative to the support table 36 when directed into the groove 39. A push handle is mounted above the plate 12 between respective right and left side plates 42 and 43 extending downwardly and terminating in a respective axle 44 that is received within a support table axe receiving groove 45 directed into opposed sides of the support table to guide the side plates. A side plate connecting flange 47 positioned below the handle 41 and between the side plates 42 and 43 includes a plurality of spaced projection plates 48 directed rearwardly of the connecting flange 47, including a connecting plate 50 directed downwardly therefrom positioned between support plate webs 49 mounted to the top surface of the support plate 12 and secured thereto by a second axle 52, with the first axle 51 directed through the spaced projection plates 48 directed through an associated slot 53 within the connecting plate 50. The FIG. 9 illustrates the handle 41 oriented rearwardly of the support plate, while the organization of FIG. 10 illustrates the handle 41 forwardly of the support plate structure providing for various leverages in utilization of the handle.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A potato cutting apparatus, comprising, a support plate, the support plate including a support plate top surface spaced from, parallel to, and coextensive with a support plate bottom surface, the support plate bottom surface including a matrix of cutting tubes projecting orthogonally from the support plate bottom surface and extending through the support plate in an orthogonal relationship terminating and projecting through the support plate top surface, the cutting tubes each including an annular cutting edge formed at a lower distal end of each cutting tube spaced from the support plate bottom surface, and a support plate handle mounted to the support plate spaced above the support plate top surface, and the support plate including a first side spaced from a second side a predetermined first spacing and including a first end wall spaced from a second end wall a predetermined second spacing, and a die table, the die table including a die table opening, wherein the die table opening includes an opening first side wall spaced from an opening second side wall a space equal to the first spacing, and the die table including an opening first end wall spaced from an opening second end wall spaced apart the predetermined second spacing to complementarily receive the support plate within the opening, and the die table including a plurality of die table legs extending orthogonally below the die table, and a die table floor, with the legs mounted to the die table floor.

2. An apparatus as set forth in claim 1 wherein the die table floor includes a die table side wall, the die table side wall includes a plurality of side wall sockets, each side wall socket receiving a leg member therewithin, and each of the side wall sockets are arranged in a parallel relationship relative to one another and are orthogonally oriented relative to the die table floor.

3. An apparatus as set forth in claim 2 wherein the support plate first side includes a first side projection oriented medially of the first side, and the support plate second side includes a second side projection positioned medially of the second side, wherein the first side projection and the second projection extend exteriorly of the support plate, and the opening first side wall includes a first side wall recess positioned medially of the first side wall, and the opening second side wall includes a second side wall recess positioned medially of the second side wall, wherein the first side wall recess is arranged to complementarily receive the first side projection, and the second side wall recess is arranged to complementarily receive the second side projection therewithin.

4. An apparatus as set forth in claim 3 wherein the first side wall recess includes a first recess floor spaced below a top surface of the die table, and the second side wall recess includes a second side wall recess floor spaced above the top wall of the die table, the first recess floor and the second recess floor are coplanar relative to one another and wherein the die table includes a die table bottom surface and the first recess floor and the second recess floor are spaced above the die table bottom surface, and the first recess floor and second recess floor are spaced above the die table floor a predetermined distance, and wherein each cutting tube of said matrix of cutting tubes extends below the support plate bottom surface a predetermined length substantially equal to the predetermined distance.

5. An apparatus as set forth in claim 4 wherein the opening includes a first support bar and a second support bar to receive a potato to be cut thereon, wherein the first support bar and the second support bar are received through the matrix of cutting tubes for abutment with the support plate bottom surface when the support plate is directed into the die table opening.

* * * * *